(No Model.)
L. BRADLEY.
ELECTRICALLY OPERATED WIND VANE.
No. 525,000.  Patented Aug. 28, 1894.
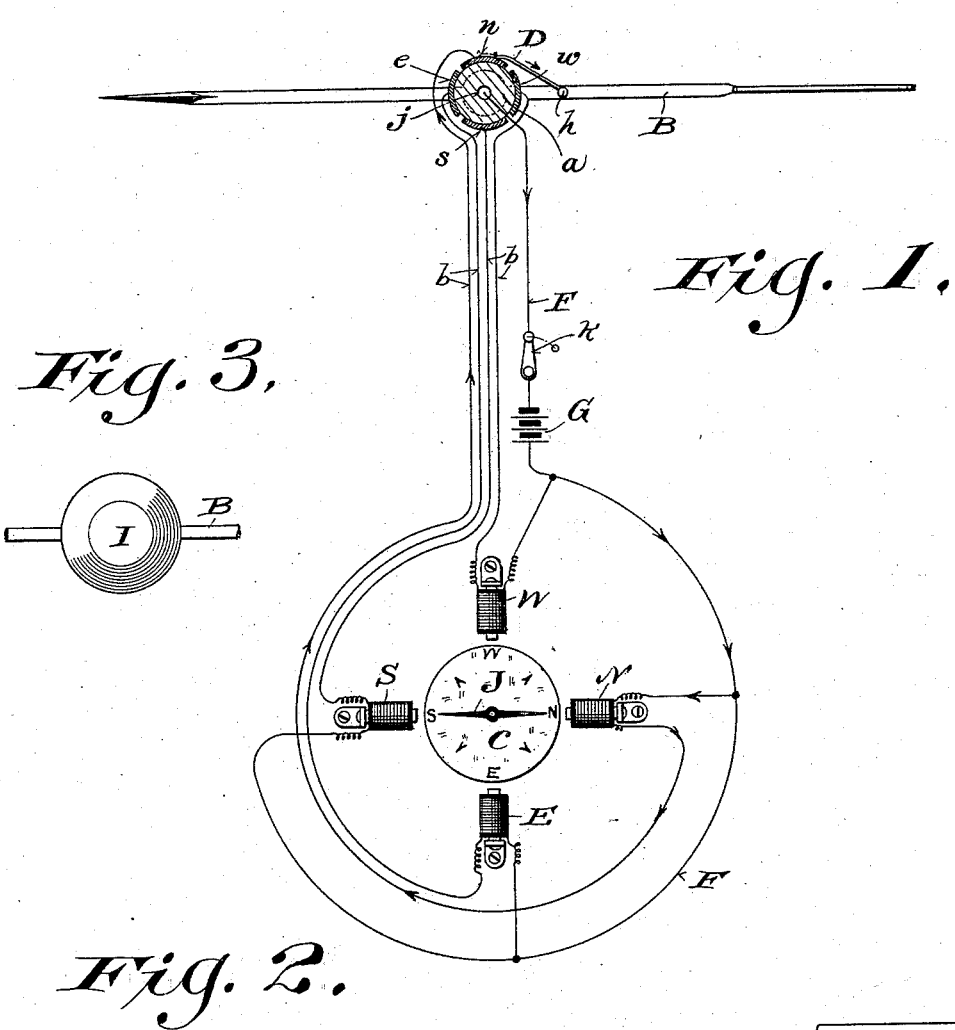

UNITED STATES PATENT OFFICE.

LYNDE BRADLEY, OF MILWAUKEE, WISCONSIN.

ELECTRICALLY-OPERATED WIND-VANE.

SPECIFICATION forming part of Letters Patent No. 525,000, dated August 28, 1894.

Application filed January 31, 1894. Serial No. 498,584. (No model.)

*To all whom it may concern:*

Be it known that I, LYNDE BRADLEY, a citizen of the United States, and a resident of Milwaukee, in the county of Milwaukee, and in the State of Wisconsin, have invented certain new and useful Improvements in Electrically-Operated Wind-Indicators; and I do hereby declare that the following is a full, clear, and exact description thereof.

My invention relates to electric devices for indicating the direction of the wind and it consists in certain peculiarities of construction, and combination of parts, as will be hereinafter fully set forth and subsequently claimed.

In the drawings: Figure 1 is a view, mainly diagrammatic, illustrating my present invention, the pole supporting the weather-vane being represented in section on the line 1—1 of Fig. 2. Fig. 2 is a partly sectional view of said pole and weather-vane. Fig. 3 is a detail plan view, showing the protecting cap above the said pole.

A represents the pole or staff which supports the weather-vane B, the upper part of said pole being preferably reduced, as shown at $a$, and there provided with a series of metallic plates, separated or insulated from each other. There may be any number of these plates desired, corresponding to the various points of the compass, but to simplify the matter I have shown only four, marked $n, e, s, w$, connected by the wires $b\ b\ b\ b$ to the four magnets N, E, S, W, placed adjacent to the correspondingly marked cardinal points on the compass-dial C. On the top of the pole A is a metallic plate or bearing $c$, on which rests a swivel-plate $d$, also of metal, having a swivel-pin $f$ passing down through a central bore in the plate or bearing $c$, said swivel plate $d$ having ears $g\ g$, preferably integral therewith, by which it is secured to the shaft of the weather-vane B.

D is a metallic brush for contact with the described plates $n, e, s, w$, secured to the vane B in any convenient manner, as by the metallic pin $h$, said brush or pin being wired to an ear $g$ or other convenient part of the swivel-plate $d$, as by the wire $i$.

F is a return or "ground" wire, connected to the plate or bearing $c$, the connection being conveniently made through a bore or opening $j$ in the pole A, and said wire F and its branches connecting also with the described magnets.

G designates a battery, of any ordinary construction, and $k$ a switch, to break the circuit and thus economize the use of said battery when desired. The wires $b\ b$ may also pass through bores or openings $m\ m$ in the pole A, and the upper part of said pole and its attachments may be protected by a sleeve H, while the vane B preferably carries a cap I, as shown, to cover and protect from the weather the top of said pole and its attachments.

The operation of my device will be readily understood from the foregoing description of its construction, taken in connection with the accompanying drawings. In the illustration given, the wind is to be understood as blowing from the north, and having driven the vane B into the corresponding position, the brush D rests upon the plate $n$ and the switch $k$ being closed, this contact of the brush and plate has served to energize the magnet N and attract the needle J so that said needle points to the point indicating the north on the dial plate C. Any change of the wind will carry the vane B around to the proper point, so that the brush D will rest on the appropriate contact and the corresponding magnet will be instantly energized. In ordinary use there would be at least eight points of the compass indicated and represented by magnets and properly wired contact plates, but as stated, to avoid confusion and needless multiplication in the drawings, I have shown only four, and it will be readily understood there might be sixteen or more points indicated if greater precision was desired. If preferred the switch $k$ may be arranged to be normally open, and only closed by a push-button or similar device, when an "observation" is to be taken.

While I prefer to construct the brush D with only a slight contact point, as shown, less than the distance of the space or insulation between the contact plates, it is obvious that if desired the contact point could be lengthened (as indicated in dotted lines, at $n$) so that if the said contact point should rest upon two of said plates at the same time the magnets wired to both of them would be simultaneously energized, and the needle J would then be attracted to a point midway between the dial marks corresponding to said magnets and contact-plates and in this way the intermediate points of the compass could be indicated without increasing the number of contact plates and connected magnets.

While I have shown a polarized or ordinary compass needle as the indicator, it is obvious that I may use, in place thereof, any suitable armature adapted to be actuated by the energization of the said magnets, or any index point under control of such armature, and similarly; the specific construction of the various parts described may be varied as found desirable in any instance, so long as their several functions remain the same, without departing from the spirit of my invention.

Having described my invention, what I claim as new, and desire to secure by Letters Patent, is—

In an electrically operated wind-indicator, the pole A, having a reduced upper end $a$, sleeve H, and protecting cap I; the vane B, revoluble thereon; the insulated contact plates $n, e, s, w$; the series of magnets corresponding with the contact plates, and electrically connected therewith; the brush D, carried by the vane; the pin $h$, with its connections; the dial C; the needle J, actuated by the energization of the magnets; the ground-wire F; the battery G; and the switch $k$, all combined, arranged and operating as hereinbefore described.

In testimony that I claim the foregoing I have hereunto set my hand, at Milwaukee, in the county of Milwaukee and State of Wisconsin, in the presence of two witnesses.

LYNDE BRADLEY.

Witnesses:
H. G. UNDERWOOD,
HENRY DANKERT.